United States Patent
Isayama et al.

(10) Patent No.: US 10,801,544 B2
(45) Date of Patent: Oct. 13, 2020

(54) TILTING PAD JOURNAL BEARING MANUFACTURING METHOD, TILTING PAD JOURNAL BEARING, AND COMPRESSOR

(71) Applicant: MITSUBISHI HEAVY INDUSTRIES COMPRESSOR CORPORATION, Tokyo (JP)

(72) Inventors: Shuichi Isayama, Tokyo (JP); Naoyuki Nagai, Tokyo (JP); Takuzo Shigihara, Tokyo (JP); Hideki Nagao, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 16/319,370

(22) PCT Filed: Jul. 4, 2017

(86) PCT No.: PCT/JP2017/024478
§ 371 (c)(1),
(2) Date: Jan. 21, 2019

(87) PCT Pub. No.: WO2018/109965
PCT Pub. Date: Jun. 21, 2018

(65) Prior Publication Data
US 2019/0226519 A1    Jul. 25, 2019

(30) Foreign Application Priority Data

Dec. 14, 2016 (JP) .................. 2016-242569

(51) Int. Cl.
*F16C 17/03* (2006.01)
*F16C 33/20* (2006.01)
(Continued)

(52) U.S. Cl.
CPC .............. *F16C 17/03* (2013.01); *F01D 25/22* (2013.01); *F16C 33/208* (2013.01); *F16C 43/02* (2013.01);
(Continued)

(58) Field of Classification Search
CPC ........ F16C 17/02; F16C 17/03; F16C 17/035; F16C 32/0614; F16C 32/0666; F16C 33/208
See application file for complete search history.

(56) References Cited

U.S. PATENT DOCUMENTS 3,205,028 A    9/1965  Mech et al.
4,636,095 A *  1/1987  Gerling ................... F16C 17/03
                                                              384/114
(Continued)

FOREIGN PATENT DOCUMENTS

CN    2352752 Y     12/1999
CN    205298262 U    6/2016
(Continued)

OTHER PUBLICATIONS

International Search Report and Written Opinion in corresponding International Application No. PCT/JP2017/024478, dated Sep. 26, 2017 (13 pages).

*Primary Examiner* — James Pilkington
(74) *Attorney, Agent, or Firm* — Osha Liang LLP

(57) ABSTRACT

A tilting pad journal bearing manufacturing method includes a first process and a second process. In the first process, a pivot fitting hole is formed on a convex curved outer circumferential surface of the tilting pad. The pivot fitting hole is recessed from the outer circumferential surface toward an inner circumferential surface and has an inner diameter smaller than an outer diameter of the distal end portion of the pivot. In the second process, a concave portion is formed on the concave curved inner circumferential
(Continued)

surface of the tilting pad by attaching the distal end portion of the pivot to the pivot fitting hole by interference-fitting.

1 Claim, 4 Drawing Sheets

(51) Int. Cl.
*F16C 43/02* (2006.01)
*F01D 25/22* (2006.01)
*F16C 32/06* (2006.01)

(52) U.S. Cl.
CPC ...... *F05D 2220/40* (2013.01); *F16C 32/0614* (2013.01); *F16C 2220/40* (2013.01); *F16C 2226/12* (2013.01); *F16C 2360/24* (2013.01)

(56) References Cited

U.S. PATENT DOCUMENTS

| | | | |
|---|---|---|---|
| 5,795,077 A * | 8/1998 | Gozdawa | F16C 33/043 384/117 |
| 7,066,651 B2 * | 6/2006 | Nicholas | F16C 27/02 384/99 |
| 7,625,121 B2 * | 12/2009 | Pettinato | F16C 17/03 384/99 |
| 7,758,247 B2 * | 7/2010 | Geiger | F16C 17/03 384/309 |
| 2019/0010977 A1 | 1/2019 | Shigihara et al. | |

FOREIGN PATENT DOCUMENTS

| | | |
|---|---|---|
| JP | S62-127508 A | 6/1987 |
| JP | H03-121306 A | 5/1991 |
| JP | H07-317752 A | 12/1995 |
| JP | H08-042560 A | 2/1996 |
| JP | 2000-266040 A | 9/2000 |
| JP | 2001-124062 A | 5/2001 |
| JP | 3377612 B2 | 2/2003 |
| JP | 2013-057335 A | 3/2013 |
| JP | 5800420 B | 10/2015 |
| JP | 2017-137960 A | 8/2017 |

* cited by examiner

TILTING PAD JOURNAL BEARING MANUFACTURING METHOD, TILTING PAD JOURNAL BEARING, AND COMPRESSOR

TECHNICAL FIELD

The present invention relates to a tilting pad journal bearing manufacturing method, a tilting pad journal bearing, and a compressor.

Priority is claimed on Japanese Patent Application No. 2016-242569, filed Dec. 14, 2016, the content of which is incorporated herein by reference.

BACKGROUND ART

A tilting pad journal bearing is widely used as, for example, a bearing for a high-speed rotary machine such as a turbo compressor because it has many advantages such as high vibration stability at high speed.

The tilting pad journal bearing of this kind, for example, includes a bearing housing, a plurality of pivots and a tilting pad. The bearing housing is formed, for example, in a substantially cylindrical shape, and a rotary shaft is inserted into the bearing housing. Axes of the bearing housing and the rotary shaft are disposed coaxially with each other. The plurality of pivots are integrally attached to the bearing housing. The tilting pads are supported by a plurality of pivots, respectively. The tilting pads are attached to the respective distal end portions of the plurality of pivots. The tilting pads are disposed in a substantially ring shape to surround the rotary shaft within the bearing housing.

In the tilting pad journal bearing, a lubricant such as oil or water is supplied to the interior of the bearing housing. The lubricant is supplied between an inner circumferential surface of each tilting pad and an outer circumferential surface of the rotary shaft. Respective tilting pads that are arranged in a ring shape and receive a radial load are supported so as to be able to tilt slightly with the pivots as a fulcrum. As a result, a wedge-shaped lubricating film (a wedge-shaped oil film or the like) is formed between the inner circumferential surfaces of each tilting pad and the outer circumferential surface of the rotary shaft. The radial load is suitably supported by a fluid film pressure of the lubricating film, in this way, the tilting pad journal bearing can rotatably support the rotary shaft that rotates at a high speed.

For the tilting pad journal bearing, there is also a dynamic pressure gas bearing that uses gas rather than oil or water. The dynamic pressure gas bearing compresses gas to generate a dynamic pressure between the inner circumferential surfaces of each tilting pad and the outer circumferential surface of the rotary shaft. That is, the dynamic pressure gas bearing forms a gas film (lubricating film) between the inner circumferential surfaces of each tilting pad and the outer circumferential surface of the rotary shaft.

In the dynamic pressure gas bearing, it is possible to rotatably support a rotary shaft that rotates at high speed, using the gas film formed between the inner circumferential surfaces of each tilting pad and the outer circumferential surface of the rotary shaft in a non-contact state (see, for example, Patent Documents 1, 2, and 3).

CITATION LIST

Patent Literature

[Patent Document 1]
Japanese Unexamined Patent Application, First Publication No. H3-121306
[Patent Document 2]
Japanese Unexamined Patent Application, First Publication No. H7-317752
[Patent Document 3]
Japanese Unexamined Patent Application, First Publication No. H8-42560

SUMMARY OF INVENTION

Technical Problem

In the dynamic pressure gas bearings described in Patent Documents 1 to 3, since a high-pressure and high-temperature lubricating film is generated in a central part (a central portion of the inner circumferential surface) of the tilting pad, there is a possibility that local deformation may occur in the tilting pad and the beating performance (load capacity) may decrease.

The present invention provides a tilting pad journal bearing manufacturing method, a tilting pad journal bearing, and a compressor capable of suppressing occurrence of local deformation of the tilting pad and is proving the bearing performance.

Solution to Problem

According to a first aspect of the present invention, a method for manufacturing a tilting pad journal bearing is a method for manufacturing a tilting pad journal bearing including a bearing housing, a plurality of pivots, and a plurality of tilting pad bearings. The bearing housing is formed in a cylindrical shape, and a rotary shaft is inserted into the bearing housing. The plurality of pivots are integrally attached to the bearing housing. The plurality of tilting pads are attached to the distal end portions of the pivots. The plurality of tilting pads are arranged in a substantially ring shape to surround the rotary shaft within the bearing housing. The method for manufacturing the tilting pad journal bearing includes a first process and a second process. In the first process, a pivot fitting hole is formed on a convex curved outer circumferential surface of the tilting pad. The pivot fitting hole is recessed from the outer circumferential surface toward an inner circumferential surface side and has an inner diameter smaller than an outer diameter of the distal end portion of the pivot. In the second process, a concave portion is formed on the concave curved inner circumferential surface of the tilting pad by attaching the distal end portion of the pivot to the pivot fitting hole by interference-fitting.

By fitting the distal end portion of the pivot into the pivot fitting hole with interference-fitting (for example, shrinkage-fitting, cold-fitting, press-fitting, etc.) in this way, this interference-fitting is performed, and at the same time, it is possible to form a concave portion on the concave curved inner circumferential surface of the tilting pad.

Since the concave portion is formed on the concave curved inner circumferential surface of the tilting pad, it is possible to induce the flow of the lubricant such as oil or gas toward the concave portion, and the flow of the lubricant around the concave portion. Therefore, it is possible to suppress local temperature rise in the central part (central portion) of the tilting pad and local pressure rise in the lubricating film.

According to a second aspect of the present invention, the tilting pad journal bearing according to the first aspect may be a dynamic pressure gas bearing that rotatably supports the rotary shaft in a non-contact state. The dynamic pressure gas bearing compresses gas between the inner circumferential surface of the tilting pad and an outer circumferential surface of the rotary shaft to generate a dynamic pressure, and forms a gas film between the inner circumferential surface of the tilting pad and the outer circumferential surface of the rotary shaft.

In this way, it is also possible to form a concave portion in the tilting pad in the dynamic pressure gas bearing.

According to a third aspect of the present invention, a tilting pad journal bearing is a tilting pad journal bearing including a bearing housing, a plurality of pivots, and a plurality of tilting pads. The bearing housing is formed in a tubular shape and has a rotary shaft inserted therein. The plurality of pivots are integrally attached to the bearing housing. Each of the plurality of tilting pads is formed in a circular arc shape and attached to a distal end portion of a pivot. The plurality of tilting pads are disposed in a substantially ring shape to surround the rotary shaft within the bearing housing. A concave portion substantially centered on an extension line of an axis of the pivot is provided on a concave curved inner circumferential surface of the tilting pad.

Here, "substantially centered" of the "concave portion substantially centered on the extension line of the pivot axis" in the present invention strictly means that the extension line of the pivot axis need not be coaxially disposed on the center line of the concave portion, and error in manufacturing and the like are allowed.

With such a configuration, it is possible to induce the flow of the lubricant such as oil or gas toward the concave portion, and the flow of the lubricant around the concave portion. Therefore, it is possible to suppress the local temperature rise of the central part (central portion) of the tilting pad and the local pressure rise of the lubricating film.

According to a fourth aspect of the present invention, the tilting pad journal bearing according to the third aspect may be a dynamic pressure gas bearing that rotatably supports the rotary shaft in a non-contact state. The dynamic pressure gas bearing compresses gas between the inner circumferential surface of the tilting pad and an outer circumferential surface of the rotary shaft to generate a dynamic pressure, and forms a gas film between the inner circumferential surface of the tilting pad and the outer circumferential surface of the rotary shaft.

With a configuration like this, it is possible to suppress occurrence of local deformation of the tilting pad in the dynamic pressure gas bearing.

According to a fifth aspect of the present invention, a compressor includes the tilting pad journal bearing according to the third or fourth aspect and is configured to compress a fluid in accordance with rotation of the rotary shaft about the axis.

With such a configuration, since the bearing performance can be improved, the reliability of the compressor can be improved.

Advantageous Effects of Invention

According to the tilting pad journal bearing manufacturing method, the tilting pad journal bearing and the compressor, since it is possible to suppress occurrence, of the local deformation in the tilting pad, it is possible to improve the bearing performance (load capacity).

DESCRIPTION OF EMBODIMENTS

Hereinafter, a tilting pad journal bearing manufacturing method, a tilting pad journal beating, and a compressor according to an embodiment of the present invention will be described referring to FIGS. 1 to 5.

In this embodiment, description will be provided on the assumption that the tilting pad journal bearing according to the present invention is a dynamic pressure gas bearing. The dynamic pressure gas bearing compresses a gas between the inner circumferential surfaces of each tilting pad (bearing pad) and the outer circumferential surface of the rotary shaft and generates a dynamic pressure, using gas rather than oil or water as a lubricant. That is, the dynamic pressure gas bearing rotatably supports a rotary shaft that rotates at a high speed, by forming a gas film (a lubricating film) between the inner circumferential surfaces of each tilting pad and the outer circumferential surface of the rotary shaft.

The compressor of this embodiment is, for example, a turbo compressor or the like, and is configured to rotate the rotary shaft at high speed around the axis and compress the fluid by utilizing the rotation of the rotary shaft. For example, an impeller is rotated by the rotary shaft, and the gas is compressed by the centrifugal force of the rotating impeller.

The compressor includes a tilting pad journal bearing as means for rotatably supporting the rotary shaft.

Figure 1:
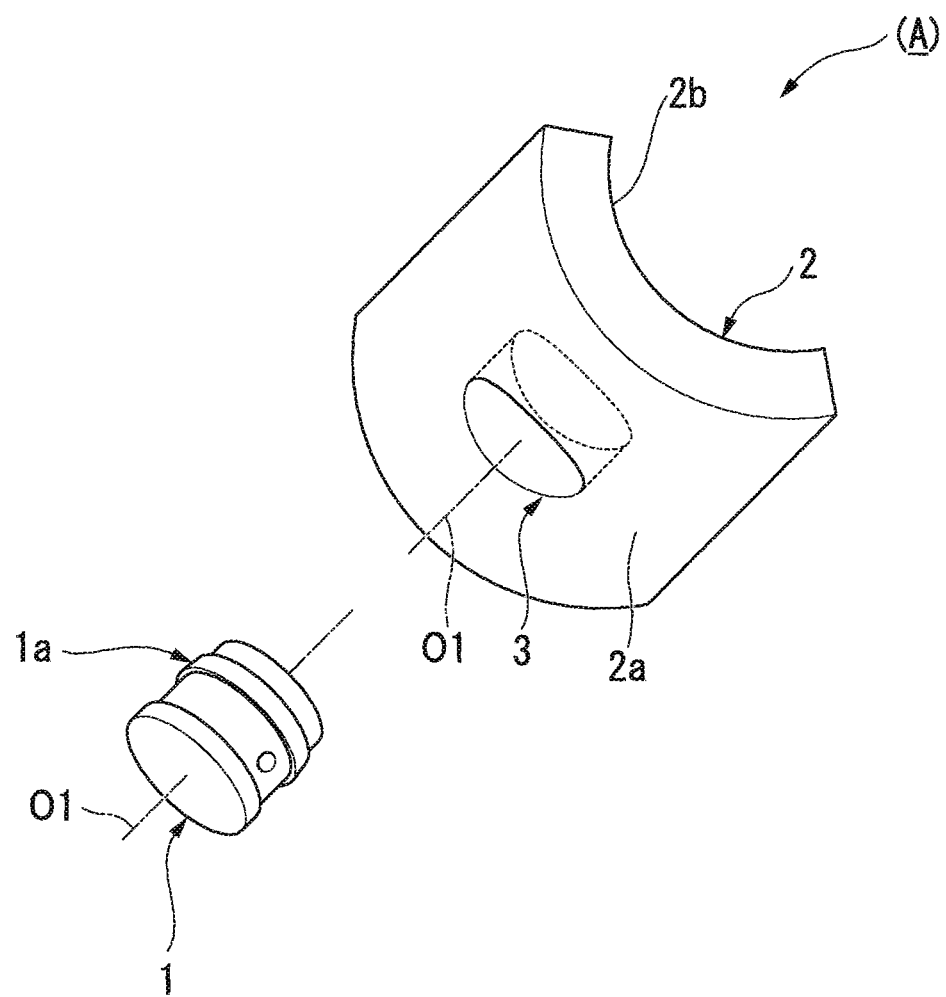
FIG. 1 is a perspective view showing a pivot and a tilting pad of a tilting pad journal bearing according to an embodiment of the present invention.

As shown in FIG. 1, a tilting pad journal bearing A of the present embodiment includes a bearing housing (not shown), a plurality of pivots 1, and a plurality of tilting pads 2. The bearing housing (not shown) is formed in a substantially cylindrical shape. A rotary shaft (not shown) is inserted into the bearing housing (not shown). The axes of the bearing housing (not shown) and the rotary shaft (not shown) are disposed coaxially with each other.

The plurality of pivots 1 are integrally attached to the bearing housing (not shown).

Each of the plurality of tilting pads 2 is formed in a circular arc-shaped plate shape when viewed from an axial direction. The tilting pads 2 are attached to a distal end portions 1*a* of the pivot 1, respectively. The tilting pads 2 are arranged in a substantially ring shape to surround the rotary shaft (not shown) in the bearing housing (not shown).

The tilting pad 2 of this embodiment is provided with a pivot fitting hole 3. The pivot fitting hole 3 is recessed from the outer circumferential surface 2*a* of the tilting pad 2 toward the inner circumferential surface 2*b* side. The pivot fitting hole 3 is formed to have a diameter smaller than an outer diameter of the distal end portion 1*a* of the pivot 1 which is formed in a substantially columnar shape. The distal end portion 1*a* of the pivot 1 is attached to each pivot fitting hole 3 of each tilting pad 2 by "interference fitting" such as a shrinkage-fitting, a cold-fitting, and a press-fitting. That is, the tilting pad 2 is integrally fixed to the pivot 1 and is supported by the pivot 1.

Figure 2A:
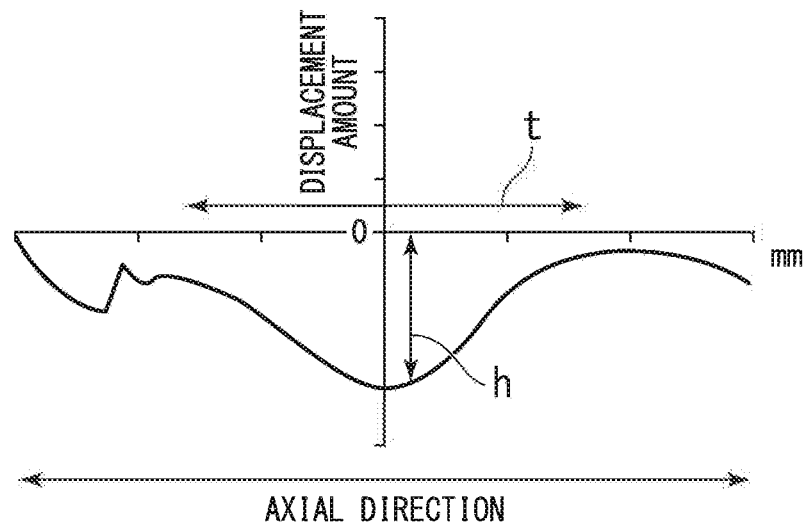
FIG. 2A is a view showing a 2D shape measurement result (an axial direction of a pivot position) of an inner circumferential surface (a concave portion) of the tilting pad.
Figure 2B:
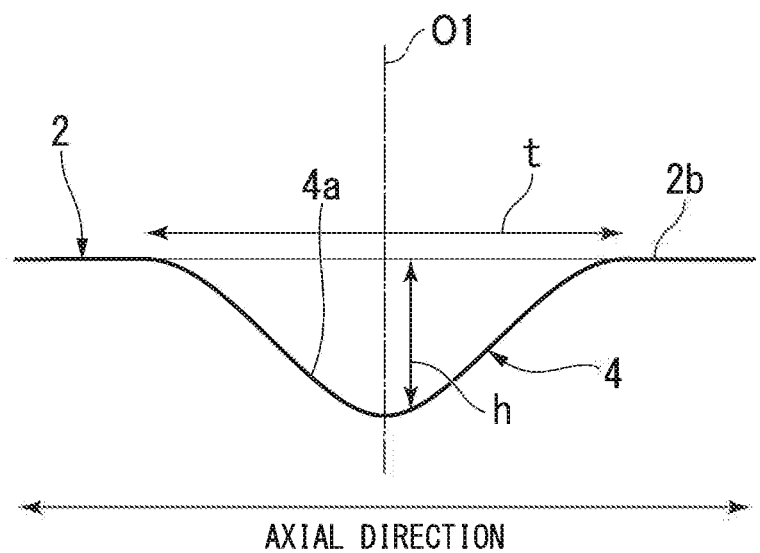
FIG. 2B is a cross-sectional view showing an example of an inner circumferential surface (a concave portion) of the tilting pad of the tilting pad journal bearing according to an embodiment of the present invention.

As shown in FIG. 2B, each tilting pad 2 has a concave portion 4 formed on a concave curved inner circumferential surface 2*b*. The concave portion 4 has a substantially concave curved surface 4*a* with an extension line of an axis O1 of the pivot 1 as a substantial center.

Figure 3A:
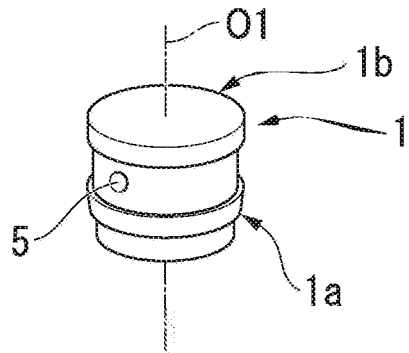
FIG. 3A is a perspective view showing a pivot of the tilting pad journal bearing according to an embodiment of the present invention.
Figure 3B:
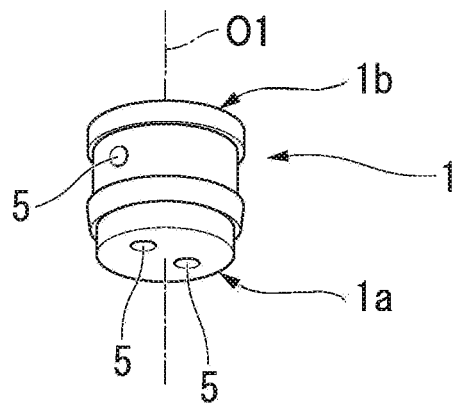
FIG. 3B is a perspective view showing the pivot of the tilting pad journal bearing according to an embodiment of the present invention.

As shown in FIGS. 3A and 3B, the pivot 1 of this embodiment is formed in a substantially columnar shape, and has a compressed gas supply path 5 formed to penetrate from a rear end portion 1*b* side to the distal end portion 1*a* (distal end surface). The compressed gas supply path 5 is intended to supply the compressed gas between the inner circumferential surfaces 2*b* of each tilting pad 2 and the outer circumferential surface (not shown) of the rotary shaft before starting to rotate the rotary shaft. By forming a gas film between the inner circumferential surface 2*b* of the tilting pad 2 and the outer circumferential surface (not shown) of the rotary shaft, it is possible to bring the tilting pad 2 and the rotary shaft into a non-contact state.

Figure 4:
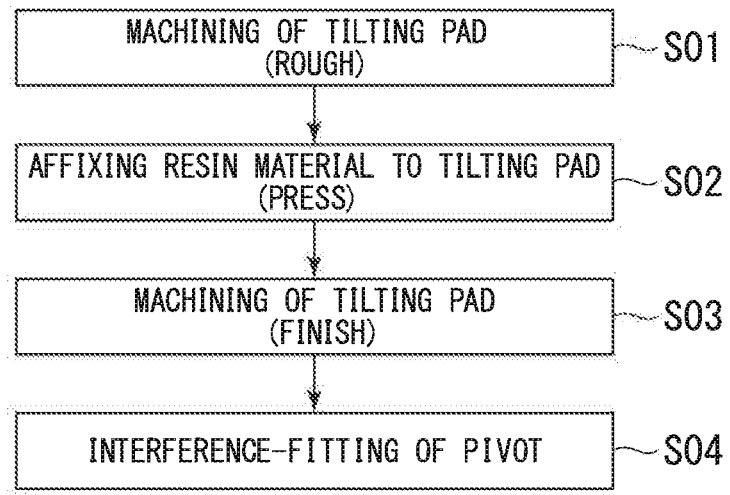
FIG. 4 is a flowchart showing an example of a liking pad journal bearing manufacturing method according to an embodiment of the present invention.
Figure 5:
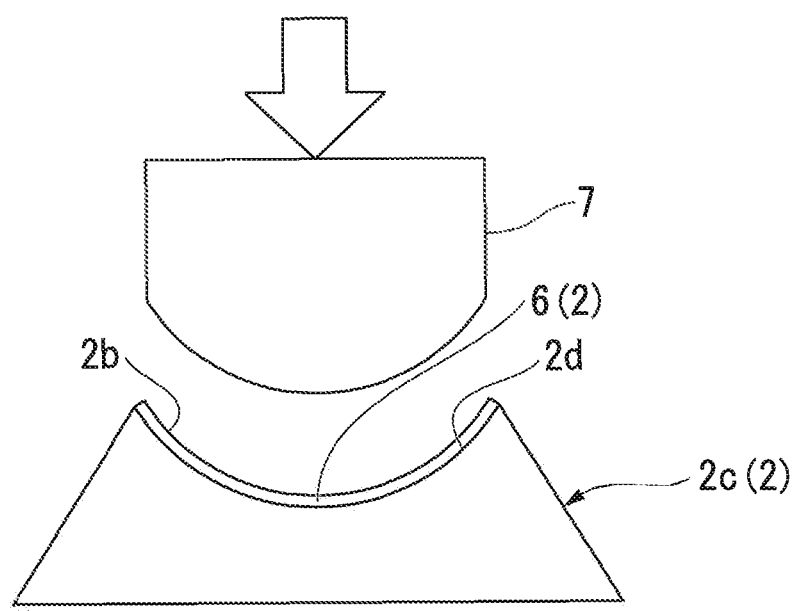
FIG. 5 is a view showing a process of pressure-welding a resin material against the inner circumferential surface of the tilting pad in the tilting pad journal bearing manufacturing method according to an embodiment of the present invention.

Next, a method for manufacturing the tilting pad journal bearing A in the present embodiment will be described with reference to FIG. 4. In order to manufacture the tilting pad journal bearing A of the present embodiment having the above-described configuration, metal material is first machined to roughly process a back metal portion 2*c* (see FIG. 5) of the tilting pad 2 (step S01).

Next, a resin material 6 such as poly ether ether ketone resin (PEEK) is affixed by laminating to an inner circumferential surface 2*d* (see FIG. 5) of the back metal portion 2*c* of the tilting pad 2 formed into a concave circular arc surface shape having a predetermined curvature by rough processing. Further, the resin material 6 is pressure-welded by the metal mold 7, and the resin material 6 is integrated with the inner circumferential surface portion of the tilting pad 2 (step S02).

Next, the back metal portion 2*c* of the tilting pad 2 is machined to form a convex circular arc-shaped outer circumferential surface 2*a* having a predetermined curvature as shown in FIG. 1. Further, a pivot fitting hole 3 is formed at a predetermined position on the outer circumferential surface 2*a* (a first process). When forming the pivot fitting hole 3, its inner diameter is made slightly smaller than the outer diameter of the distal end portion 1*a* of the substantially columnar pivot 1. For example, in the present embodiment, the pivot fitting hole 3 is formed to have a diameter smaller than the outer diameter of the pivot 1 by about 100 μm. Further, as described above, the tilting pad 2 (the back metal portion 2*c*) formed into a circular arc shape having a predetermined shape is finished (step S03).

Next, the distal end portion 1*a* of the substantially columnar pivot 1 is attached to the pivot fitting hole 3 of the tilting pad 2 by "interference-fitting" such as shrink-fitting, cold-fitting, or press-fitting (a second process). As a result, the pivot 1 is set to a state of being integrally attached to the tilting pad 2.

At this time, by attaching the distal end portion 1*a* of the pivot 1 to the pivot fitting hole 3 with "interference-fitting", as shown in FIGS. 2A and 2B, an interference-fitting is performed, and at the same time, a concave portion 4 is automatically formed on the concave curved inner circumferential surface 2*b* of the tilting pad 2. When the "interference-fitting" is performed, a force drawn toward the outer circumferential surface 2*a*, that is, the inner side inevitably occurs with respect to the concave curved inner circumferential surface 2*b* of the tilting pad 2. The concave portion 4 is automatically formed on the inner circumferential surface 2*b* by this force.

For example, when the pivot 1 having an outer diameter of the distal end portion 1*a* of 50 mm is "interference-fitted" into the pivot fitting hole 3 having a smaller diameter than the outer diameter of the distal end portion 1*a* of the pivot 1 by about 100 μm, the concave portion 4 having a concave curved surface 4*a* having a maximum depth h of about 15 μm and an inner diameter t of about 100 mm is automatically formed with the extension line of the axis O1 of the pivot 1 substantially at the center.

According to the tilting pad journal bearing A of the present embodiment, since the concave portion 4 is formed on the concave curved inner circumferential surface 2*b* of the tilting pad 2, it is possible to induce the flow of the gas as the lubricant toward the concave portion 4, and the flow of the lubricant around the concave portion 4. Therefore, it is possible to suppress the local temperature rise of the central portion of the tilting pad 2 and the local pressure rise of the lubricating film.

This makes it possible to suppress occurrence of the local deformation in the tilting pad 2. As a result, it is possible to improve bearing performance (load capacity).

An embodiment of the method for manufacturing the tilting pad journal bearing, the tilting pad journal bearing, and the compressor according to the present invention have been described above. However, the present invention is not limited to the above-described embodiment and can be appropriately changed within the scope that does not depart from the spirit of the invention.

For example, in the present embodiment, the tilting pad journal bearing A according to the present invention is provided in a compressor such as a turbo compressor. However, the tilting pad journal bearing A according to the present invention can be applied to any bearing for suitably supporting a radial load and rotatably supporting a rotary shaft that rotates around an axis.

The compressor of the present invention is provided with the tilting pad journal bearing A, may be configured to compress the fluid in accordance with the rotation of the rotary shaft around the axis, and may be, for example, a compressor other than a turbo compressor, such as a rotary compressor and a scroll compressor.

In the present embodiment, the tilting pad journal bearing A according to the present invention has been described as a dynamic pressure gas bearing that uses gas, rather than oil or water, as a lubricant. However, the tilting pad journal bearing A according to the present invention may rotatably support the rotary shaft, using a lubricant such as oil or water other than a gas. In this case, it is also possible to obtain the same operation and effects as the present embodiment.

INDUSTRIAL APPLICABILITY

The present invention can be applied to a tilting pad journal bearing and a compressor. According to the present invention, since it is possible to suppress occurrence of local deformation in the tilting pad, the bearing performance (load capability) can be improved.

REFERENCE SIGNS LIST

1 Pivot
1a Distal end portion
1b Rear end portion
2 Tilting pad (bearing pad)
2a Outer circumferential surface
2b inner circumferential surface
2c Back metal portion
2d Inner circumferential surface of back metal portion.
3 Pivot fitting hole
4 Concave portion
4a Concave curved surface
5 Compressed gas supply path
6 Resin material
7 Metal old
O1 Axis of pivot

The invention claimed is:

1. A method for manufacturing a tilting pad journal bearing including a bearing housing formed in a tubular shape and having a rotary shaft inserted therein, a substantially columnar pivot integrally attached to the bearing housing, and a tilting pad attached to a distal end portion of the substantially columnar pivot and disposed to surround the rotary shaft inside the bearing housing, the method comprising:

machining a metal material into a back metal portion of the tilting pad that includes an inner circumferential surface with a concave circular arc surface having a predetermined curvature;

affixing a resin material by laminating to the inner circumferential surface of the back metal portion of the tilting pad, wherein laminating the resin material uses a metal mold that pressure-welds and integrates the resin material with the inner circumferential surface portion of the tilting pad;

machining the back metal portion of the tilting pad to form an outer circumferential surface with a convex circular arc that has a predetermined curvature, and forming a pivot fitting hole at a predetermined position on the outer circumferential surface, wherein when forming the pivot fitting hole, an inner diameter of the pivot fitting hole is made smaller than an outer diameter of the distal end portion of the substantially columnar pivot; and forming a concave portion on a concave curved inner circumferential surface of the tilting pad by attaching the distal end portion of the substantially columnar pivot to the pivot fitting hole by interference-fitting.

* * * * *